United States Patent
Berg et al.

(10) Patent No.: US 8,684,726 B2
(45) Date of Patent: Apr. 1, 2014

(54) DEVICE FOR PRODUCING PLASTIC MOLDED PARTS HAVING A LOCKING RING WITH A WEAR RESISTANT MATERIAL

(75) Inventors: Lars Fredrik Berg, Karlsruhe (DE); Bernd Thoma, Karlsruhe (DE)

(73) Assignee: Fraunhofer-Gesellschaft zur Förderung der Angewandten Forschung E.V., München (DE)

( * ) Notice: Subject to any disclaimer, the term of this patent is extended or adjusted under 35 U.S.C. 154(b) by 0 days.

(21) Appl. No.: 13/384,056

(22) PCT Filed: Jul. 14, 2010

(86) PCT No.: PCT/EP2010/004291
§ 371 (c)(1),
(2), (4) Date: Jan. 13, 2012

(87) PCT Pub. No.: WO2011/006648
PCT Pub. Date: Jan. 20, 2011

(65) Prior Publication Data
US 2012/0114785 A1    May 10, 2012

(30) Foreign Application Priority Data
Jul. 17, 2009  (DE) .................. 10 2009 033 681

(51) Int. Cl.
*B29C 45/60*  (2006.01)
(52) U.S. Cl.
USPC .......................................... 425/557; 425/559
(58) Field of Classification Search
USPC ............... 425/557, 558, 559; 264/109
See application file for complete search history.

(56) References Cited

U.S. PATENT DOCUMENTS

| | | | |
|---|---|---|---|
| 3,131,433 A | 5/1964 | Volland | |
| 4,369,157 A * | 1/1983 | Conner | 264/246 |
| 5,167,971 A * | 12/1992 | Gill et al. | 425/559 |
| 5,356,281 A | 10/1994 | Katsuno et al. | |
| 5,441,400 A | 8/1995 | Zeiger | |
| 5,823,540 A | 10/1998 | Grabau et al. | |
| 6,322,080 B1 | 11/2001 | Feistel | |
| 8,425,815 B2 * | 4/2013 | Muratoglu et al. | 264/109 |
| 2005/0233020 A1 | 10/2005 | Manda et al. | |

FOREIGN PATENT DOCUMENTS

| | | |
|---|---|---|
| CN | 2173874 Y | 8/1994 |
| CN | 1187869 A | 7/1998 |
| CN | 1231683 A | 10/1999 |
| DE | 7639875 U1 | 6/1978 |
| DE | 3612644 A1 | 10/1986 |
| DE | 697 17 832 T2 | 9/2003 |

(Continued)

Primary Examiner — Tim Heitbrink
(74) Attorney, Agent, or Firm — McGlew and Tuttle, P.C.

(57) ABSTRACT

A device for producing plastic moldings has an extruder and a molding tool arranged downstream of an extruder discharge opening. A screw is rotatably guided in the extruder and is axially displaceable to transfer liquid polymers, prepolymers or monomers present in the extruder into the molding tool. A nonreturn valve adjacent to a free end of the screw has a locking ring in contact with the inner circumferential wall of the extruder that includes a seal, which is applied to at least part of its outer circumference and which seals the locking ring against the circumferential wall of the extruder. The sealing material of the seal is selected from the group of the polymers, copolymers and polymer blends with a hardness lower than that of the circumferential wall of the extruder. A nonreturn valve and method of processing liquid prepolymers or monomers into plastic moldings is provided.

19 Claims, 2 Drawing Sheets

(56) References Cited

FOREIGN PATENT DOCUMENTS

| EP | 0832383 | B1 | 7/2003 |
| EP | 1 415793 | A1 | 5/2004 |
| JP | 59171916 | U | 11/1984 |
| JP | 5042568 | A | 2/1993 |
| JP | 2003340892 | A | 12/2003 |

* cited by examiner

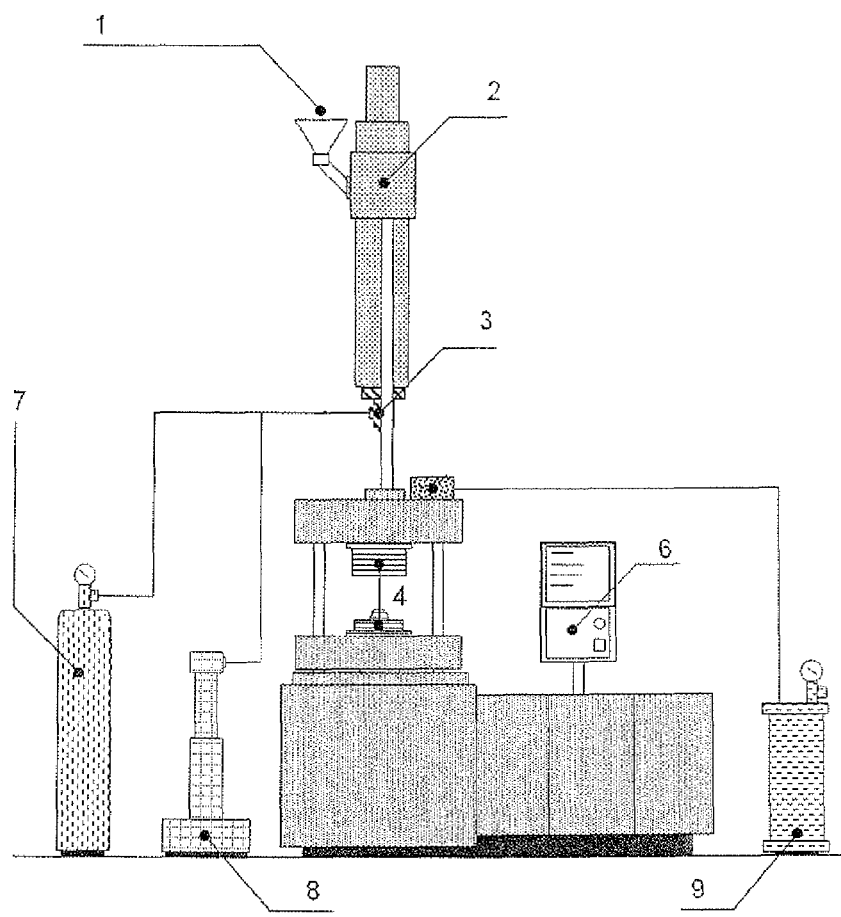
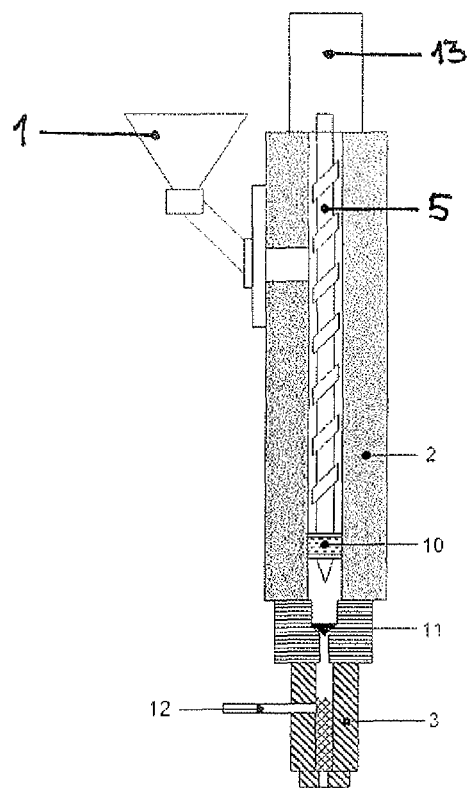
Fig. 1
Fig. 2

DEVICE FOR PRODUCING PLASTIC MOLDED PARTS HAVING A LOCKING RING WITH A WEAR RESISTANT MATERIAL

CROSS-REFERENCE TO RELATED APPLICATIONS

This application is a United States National Phase application of International Application PCT/EP2010/004291 and claims the benefit of priority under 35 U.S.C. §119 of German Patent Application DE 10 2009 033 681.8 filed Jul. 17, 2009, the entire contents of which are incorporated herein by reference.

FIELD OF THE INVENTION

The present invention pertains to a device for producing plastic moldings, with an extruder and with a molding tool arranged downstream of a discharge opening of the extruder, wherein a screw is guided in the extruder such that it is rotatable, on the one hand, and is axially displaceable, on the other hand, in order to transfer plasticized or liquid polymers, prepolymers and/or monomers present in the extruder into the molding tool, wherein a nonreturn valve is arranged in the area of the free end of the screw, wherein at least one locking ring of the nonreturn valve acting against the inner circumferential wall of the extruder has a seal applied to at least part of the outer circumference thereof, which said seal seals the locking ring against the circumferential wall. The present invention pertains, furthermore, to a nonreturn valve intended especially for such a device to be arranged in the area of the free end of the screw of an extruder as well as to the use of such a device for the direct production of polymer moldings.

BACKGROUND OF THE INVENTION

Such devices are known especially in the form of injection molding machines for thermoplastic plastics. A polymer, usually occurring in the granular form, optionally in conjunction with additives, such as fillers, reinforcing fibers, etc., is charged here into the extruder, often called "injection unit," and plasticized in the extruder. To inject the plasticized polymer into the molding tool, the screw is axially displaced by a distance to the front in the direction of the discharge opening of the extruder, which is usually formed in the form of a nozzle or of a nozzle unit, and a nonreturn valve, which extensively prevents the backflow of the plasticized polymer during the injection and guarantees the most accurate and reproducible dispensing possible of the necessary quantity of polymer, may be arranged in the area of the free end of the screw. Prior-art nonreturn valves have, in general, a locking ring, which is in contact with the inner circumferential wall of the extruder and which usually ensures satisfactory prevention of backflow of the plasticized, usually highly viscous polymer against the feed of the screw back into the extruder.

Processes have been used recently, in which not necessarily only plasticized polymers are charged into the extruder, but also—as an alternative or in addition—liquid polymers, such as especially monomers, dimers or oligomers, which are capable, optionally in the presence of an activator or initiator or catalyst, of undergoing polymerization with one another or with polymers charged additionally. Such a process is known, for example, from EP 1 415 793 A1. The advantage of such a process is especially that, based on the very low viscosity of the polymers used, it is possible to increase the percentage of fillers or filling fibers, because the latter are infiltrated, wetted or impregnated by the liquid prepolymers to a greater extent than is the case with usually highly viscous polymer melts. However, it proved to be disadvantageous, especially in case of the production of moldings of a relatively complex shape, for example, with relatively small or thin mold cavity areas, into which the polymers and/or prepolymers must be injected, that accurate and especially reproducible dispensing of the desired quantity of polymer or prepolymer is difficult if not outright impossible, which leads to inhomogeneities of the material in the molding and to a resulting increase in the amount of rejects.

US 2005/0233020 A1 describes a nonreturn valve for being arranged at the free end of an extruder of a device of this class for producing plastic moldings. The nonreturn valve may have in this case a locking ring, which is provided on its outer circumferential surface with a circumferential groove in order to receive a piston ring formed from two ring halves, which ensures sealing of the locking ring against the extruder housing, in order to extensively prevent melt from flowing back during the injection operation. Satisfactory tightness, as it would be necessary especially for resins to be processed, whose viscosity ranges from a relatively low viscosity to liquid, and/or for moldings to be produced with a comparatively complex viscosity, cannot, however, be achieved hereby, because, on the one hand, there is a risk of backflow of the resin mixture being injected into the extruder at the junction areas of the piston ring at the very high pressure prevailing during the injection operation in the outlet-side end of the extruder located downstream of the nonreturn valve, and, on the other hand, just like the other elements of the nonreturn valve, the piston ring obviously consists of metal, so that certain tolerances must be necessarily maintained between the piston ring and the extruder in order to ensure the necessary axial displaceability of the locking ring of the nonreturn valve, which said locking ring is provided with the piston ring.

JP 05-042 568 A describes another nonreturn valve for being arranged at the free end of the extruder screw of an injection molding device, wherein an outside coating of the locking ring is provided to seal the locking ring. The coating is formed from diamond-like carbon modifications. Thus, the statements made above in connection with US 2005/0233020 A1 largely apply to the very hard sealing material in the form of diamond-like carbon.

SUMMARY OF THE INVENTION

The basic object of the present invention is to impart practically complete tightness to the nonreturn valve of a device of the type mentioned in the introduction for producing plastic moldings, so that this nonreturn valve also becomes able to be used for polymers, prepolymers and/or monomers ranging from very low viscosity to liquid for producing polymer moldings of practically any desired geometry.

This object is accomplished according to the present invention in a device as well as in a nonreturn valve of the type mentioned in the introduction, which is especially suitable for use for such a device, by the sealing material of the seal of the locking ring to be selected from the group of the polymers, copolymers and polymer blends with a hardness lower than that of the material of the circumferential wall of the extruder.

Leaks of both polymer melts with especially low viscosity and especially liquid prepolymers, such as monomers, dimers or oligomers, through the nonreturn valve against the feed of the screw of the extruder or injection unit during the injection operation are reliably prevented from occurring by the embodiment according to the present invention, so that both the necessary injection pressure and the necessary quantity of polymer/prepolymer injected can be preset accurately and reproducibly. Based on the fact that the seal provided according to the present invention for the locking ring of the nonreturn valve is always in sealing contact with the inner wall of the extruder, the parameters melt viscosity and rate of injection (or the pressure generated hereby on the quantity of polymer/prepolymer), which are problematic in the state of the art, do not affect the quantity of polymer/prepolymer injected any longer, so that this quantity can be set accurately and reproducibly, and inhomogeneities or even inclusions in the plastic molding produced due to variations in the quantity of material are reliably prevented from occurring. As a consequence, it is also possible to produce highly complex moldings (e.g., those with extremely thin wall thickness or with longer flow paths within the molding tool) with, if desired, a very high percentage of fillers and/or reinforcing fibers. Due to the lower hardness of the sealing material of the seal of the locking ring compared to that of the material of the circumferential wall of the extruder, which is usually manufactured from a steel that is highly inert to both chemical attack and relatively high temperatures, e.g., up to about 300° C., satisfactory tightness of the nonreturn valve is always obtained with the lowest possible wear of the extruder wall.

Another advantage of the embodiment according to the present invention is that it offers the possibility of directly processing liquid prepolymers with an optionally high degree of filling with fillers, reinforcing fibers or the like, optionally in conjunction with plasticizable or thermoplastic polymers into plastic moldings in a conventional injection molding machine, whose screw needs only be provided with a nonreturn valve according to the present invention, wherein such an injection molding machine makes possible, based on its immanently high level of automation, shorter process cycles and consequently increased product efficiency compared to other prior-art reactive processing methods, for example, resin transfer molding (RTM), resin injection molding (RIM), etc.

In an advantageous embodiment, provisions may be made for the sealing material of the seal of the locking ring to have a coefficient of thermal expansion of at least $30 \times 10^{-6}$/K, especially at least $35 \times 10^{-6}$/K and preferably at least $40 \times 10^{-6}$/K, and the coefficient of thermal expansion may be, for example, in a preferred range of about $40 \times 10^{-6}$/K to about $150 \times 10^{-6}$/K. "Coefficient of thermal expansion" is always defined within the framework of this disclosure as the linear coefficient of expansion a, which indicates the difference in length relative to the overall length by which a solid changes during a temperature change by 1 K.

It proved to be especially advantageous in this connection if the seal of the locking ring is mounted on the circumferential wall of the extruder under a circumferential contact pressure, so that it is able to expand at the operating temperature and guarantees an extremely reliable and complete sealing in this manner. Thus, for example, at temperatures below the operating temperature, for example, at room temperature or at a lower temperature, the seal may have an outer circumference that ensures such a circumferential contact pressure with the extruder housing that simple mounting is (still) just possible. The seal will then expand at the operating temperature corresponding to its coefficient of thermal expansion, which has the above-mentioned values, which is possible due to the fact that its hardness is lower than that of the extruder material, without the nonreturn valve becoming blocked in the extruder or without damage.

While the sealing material of the seal of the locking ring should be made, in principle, from at least one wear-resistant polymer, copolymer and/or polymer blend, provisions may, furthermore, be made to increase its wear resistance, for the polymer matrix of the sealing material of the seal of the locking ring to be mixed with reinforcing fibers and/or particles, for example, carbon, glass Aramid fibers, etc., or even natural fibers or particles.

Moreover, provisions may preferably be made, as an alternative or in addition, for the polymer matrix of the sealing material of the seal of the locking ring to be mixed with particles suitable for dry lubrication, e.g., from the group comprising molybdenum sulfide (MoS), graphite, polytetrafluoroethylene (PTFE) or the like, in order to ensure a reduction of friction during the displacement of the nonreturn valve or the locking ring thereof in relation to the wall of the extruder.

The sealing material of the seal of the locking ring from the group of the polymers, copolymers or polymer blends can be adapted, in principle, to the polymers/prepolymers/monomers to be processed, and its melting point must always be above the processing temperature of such polymers by a sufficient amount especially in case of processing plasticizable polymers. The sealing material should have a temperature resistance of at least 70° C., especially at least 100° C., and substantially higher temperature resistances may also be necessary for the above-mentioned reasons, or lower temperature resistances may also be necessary, e.g., when only liquid starting materials are used, which are cured in the molding tool after injection into said molding tool.

Sealing materials from the group of the polyether ketones (PEK) and their derivatives, of the polyaryl ether ketones (PAEK) and their derivatives, of the polyhalogenated polyolefins, especially the polyfluorinated polyolefins, of the high-molecular-weight polyolefins with a molecular weight of at least 100,000 g/mole and of the polyamides (PA), including copolymers and polymer blends with same, which are chemically very extensively inert and possess both high wear resistance and a comparatively high coefficient of thermal expansion, have proved to be especially suitable sealing materials for the seal of the locking ring.

For example, sealing materials from the group of the polyether ketones (PEK), polyether ether ketones (PEEK), polyether ether ether ketones (PEEEK), polyether ketone ketones (PEKK), polyether ether ketone ketones (PEEKK), polyether ether ketone ether ketones (PEEKEK), polyether ketone ether ether ketones (PEKEEK) and polyaryl ether ketones (PAEK), including copolymers and polymer blends with the above-mentioned polymers, especially with polyether amide (PEI), such as polyaryl ether ketone-polyether imide blends (PAEK+PEI) or the like, which have not only a high wear resistance as well as a relatively high coefficient of thermal expansion, but also a very high melting point up to markedly above 300° C., so that they are capable of ensuring satisfactory sealing at any operating temperature, shall be mentioned, for example, as advantageous representatives of said polymers.

For corresponding reasons, sealing materials from the group of the polycaprolactams (PA 6), poly-(N,N'-tetramethylene adipine diamides) (PA 4.6), poly-(N,N'-hexamethylene adipine diamides) (PA 6.6), poly-(hexamethylene sebacamides) (PA 6.10), poly-(hexamethylene dodecane diamides) (PA 6.12), polyundecanolactams (PA 11), polylauryl lactams (PA 12), poly-(m-phenylene isophthalamide) (PMPI), poly-(p-phenyleneterephthalamide) (PPTA), including the cast polyamides, such as PA 6-G, PA 12-G or the like, and including copolymers and polymer blends with the above-mentioned polymers, such as PA+acrylonitrile-butadiene-styrene (ABS) copolymers, PA+EVA, PA+EPDM, PA+PPE, PA+PPS, PA+rubber or the like, shall be mentioned, for example, as further advantageous representatives of said polymers.

In addition, polytetrafluoroethylene (PTFE) or ultra-high-molecular-weight polyethylene (UHMWPE) are, for example, suitable representatives of such sealing materials, so that the seal of the locking ring of the nonreturn valve may contain PTFE and/or UHMWPE or be formed entirely herefrom. UHMWPE usually has a molecular weight between about $1 \times 10^6$ and about $10 \times 10^6$ g/mole and usually between about $2 \times 10^6$ and $6 \times 10^6$ g/mole.

The seal may be applied to the outer circumference of the locking ring of the nonreturn valve, e.g., by surface coating, which may be carried out according to any prior-art coating method, for example, pouring method or other methods known in the area of polymer technology.

As an alternative, the seal may also be inserted, e.g., into a circumferential groove of the locking ring of the nonreturn valve, optionally with the use of corresponding adhesives.

Concerning the design embodiment of the nonreturn valve, provisions may be made for the locking ring of the nonreturn valve, which said locking ring is provided with the seal, to be arranged axially displaceably between a first position, in which it is in contact with an axial stop ring of the nonreturn valve and thus prevents the passage of liquid polymers, prepolymers and/or monomers, and a second position, in which it is arranged at a spaced location from the stop ring and thus makes possible the passage of liquid polymers, prepolymers and/or monomers, as it is known as such, for example, in prior-art nonreturn valves used to process liquid silicone rubbers (LSR).

It is, of course, also conceivable, instead, conversely, that a stop ring forming a stop for the locking ring of the nonreturn valve provided with the seal to be arranged axially displaceably between a first position, in which it is in contact with the locking ring of the nonreturn valve and prevents the passage of liquid polymers, prepolymers and/or monomers in this manner, and a second position, in which it is arranged at a spaced location from the locking ring and makes possible the passage of liquid polymers, prepolymers and/or monomers in this manner.

The locking ring of the nonreturn valve provided with the seal or stop ring may be advantageously prestressed, especially elastically, in the direction of its first position, in which it is in contact with the axial stop ring or with the locking ring.

According to a variant of the device according to the present invention, provisions may be, furthermore, be made for an inlet between provided between the nonreturn valve and the discharge opening of the extruder for adding auxiliary agents, such as catalysts, activators or the like, so that corresponding activators or catalysts can be added to the reactive prepolymers charged into the extruder immediately before the injection into the molding tool, without the risk of (partial) poly[merization] reaction of the prepolymers already in the extruder owing to the reliable tightness of the seal of the locking ring according to the present invention.

As was already indicated above, the present invention is directed otherwise towards the use of a device of the above-described type for the direct production of plastic moldings, wherein liquid prepolymers and/or monomers are charged as starting material into the extruder, optionally together with plasticizable polymers and/or together with fillers and/or reinforcing fibers, transferred into the molding tool and cured.

As an alternative or in addition to fillers and/or reinforcing fibers possibly already charged into the extruder, provisions may, furthermore, be made for a fiber structure, which may be formed, for example, from one or more convolute(s) of long or endless fibers, is charged in advance into the molding tool prior to the transfer of the reaction mixture into the molding tool, and these are then impregnated by the reaction mixture, which ranges especially from more or less liquid to viscous, while bonding intimately to the polymer matrix produced by curing.

Furthermore, provisions may preferably be made for adding catalysts and/or activators accelerating the curing and/or catalysts are added to the starting material and/or such catalysts and/or activators are charged downstream of the nonreturn valve before the reaction mixture is transferred into the molding tool and cured.

Further features and advantageous of the present invention appear from the following description of an exemplary embodiment of a device according to the present invention for producing plastic moldings with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic side view of an embodiment of a device for directly producing plastic moldings;

FIG. 2 is a schematic detail of the extruder of the device according to FIG. 1 in a cross-sectional view;

DESCRIPTION OF THE PREFERRED EMBODIMENTS

Figures 3, 4:
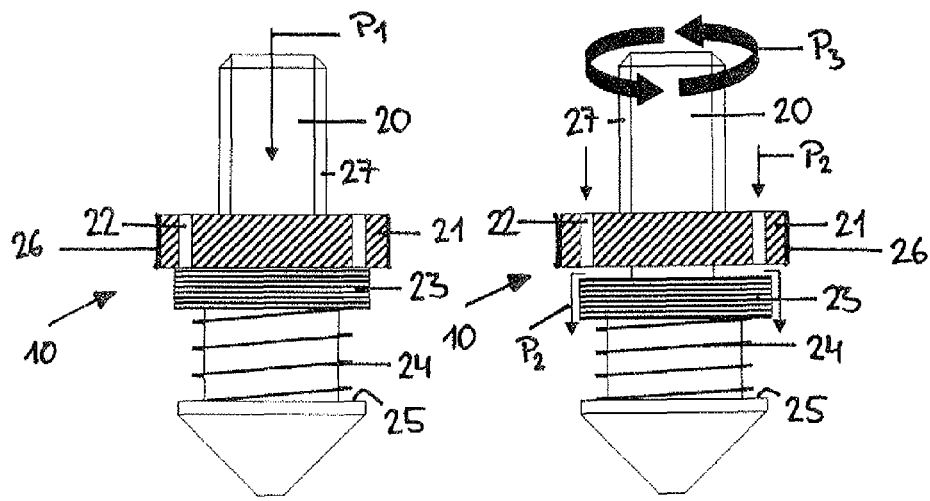
FIG. 3 is a schematic sectional view of an embodiment of a nonreturn valve in the locked position for explaining the function.
FIG. 4 is a schematic sectional view of the nonreturn valve in the passage position corresponding to FIG. 3.

Referring to the drawings in particular, FIG. 1 schematically shows a device for the direct production of plastic moldings from thermoplastic polymers and/or more or less liquid prepolymers, such as reactive monomers, dimers and/or oligomers, which may be optionally mixed with fillers and/or reinforcing fibers up to a high degree of filling. The device comprises a charging means 1 designed, e.g., in the manner of a funnel, which is arranged in the area of the end of an extruder 2, which is preferably arranged essentially vertically in order to deliver liquid prepolymers or even polymer melts of a very low viscosity downward by gravity in the direction of its discharge opening. Extruder 2 is joined (at the bottom in FIG. 1) by an, e.g., essentially T-shaped mixing nozzle 3 (cf. FIG. 2), whose inlet 12 is connected to a reservoir 8, which receives, e.g., activators, catalysts or the like suitable for initiating and/or accelerating the poly[merization] reaction of prepolymers used. These activators, catalysts or the like can be dispensed in a controlled manner by means of a dispensing pump, not shown in more detail. In addition, a pressure tank 7 connected to the mixing nozzle 3, e.g., in the form of a nitrogen storage unit, may be provided in order to rinse the mixing nozzle 3 as well as the interior of the extruder 2 corresponding thereto after an injection operation. The discharge opening of the extruder 2 arranged downstream of the mixing nozzle 3 is joined, in turn, by a molding tool 4, which is in the open position in the state shown in FIG. 1 and whose upper punch can move between the opened position and a closed position (not shown), in which it tightly closes the mold cavity formed between the upper punch and the lower punch. Molding tool 4 can, furthermore, be tempered, and it can preferably both be heated (e.g., in order to cure prepolymers in the molding tool into the plastic molding) and cooled (e.g., in order to solidify plasticized polymers in the molding tool into the plastic molding). A vacuum trap, which is used to receive the impurities rinsed out during the blow-out of the mixing nozzle 3 and the discharge opening of the extruder 2, is designed by reference number 9.

Figure 5:
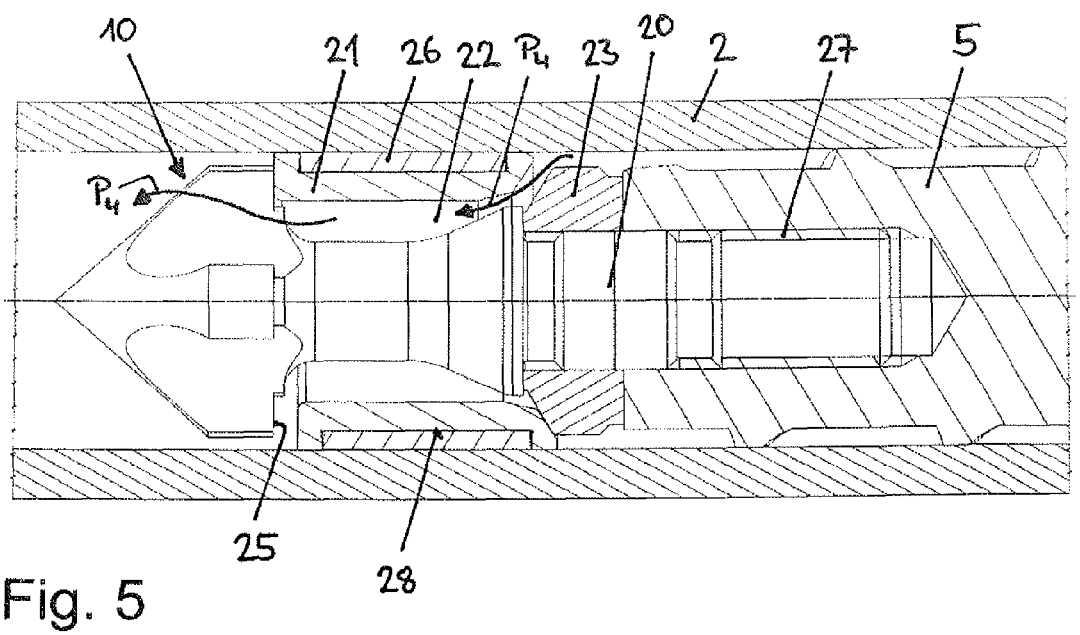
FIG. 5 is a sectional view of another embodiment of a nonreturn valve of the extruder according to FIG. 2.

As is apparent from FIG. 2, a screw 5 connected to a drive 13 is guided in the extruder 2 such that it is rotatable, on the one hand, in order to be able to plasticize polymers charged in via the charging means 1 and to homogenize basically all components charged in, such as polymers, prepolymers, fillers and reinforcing materials. On the other hand, screw 5 is displaceable axially, approximately vertically in the present exemplary embodiment, in order to inject the components charged into the extruder 2 into the molding tool 4 by moving the screw 5 downwardly. A nonreturn valve 10 explained in more detail farther below with reference to FIGS. 3 through 5 is arranged in the area of the free end of the screw 5 facing away from drive 13. A valve, e.g., one in the manner of a needle closing nozzle, as it is used in conventional injection molding machines and which is used to prevent plasticized polymers/prepolymers from being discharged from the extruder 5 during the extrusion operation or prior to the injection into the molding tool 4, may be provided downstream of the nonreturn valve 10. Likewise downstream of the needle closing nozzle 11 follows the mixing nozzle 3, whose inlet 12 is used, as was mentioned above, to add a suitable quantity of activators, catalysts, etc., if at least partly polyreactive prepolymers are used.

The mode of operation of the nonreturn valve 10 is explained in more detail in FIGS. 3 and 4 on the basis of schematic drawings. As can be recognized from this, the nonreturn valve 10 comprises a locking ring 21, which is fixed, e.g., rigidly to a carrying part 20 and which is in contact with the inner circumferential wall of the extruder 2 (FIG. 2). Locking ring 21 is provided with passages 22, for example, in the form of a ring canal passing axially through the locking ring 21 here, which are closed by a stop ring 23, which is guided axially displaceably at the carrying part 20 if said stop ring strikes the locking ring 21 (FIG. 3). Stop ring 23 may be elastically prestressed for this against the locking ring 21, by example, by means of a helical spring 24, which is seated between the stop ring 23 and a shoulder 25 in the area of the free end of the carrying part 20.

If stop ring 23 is in its locking position shown in FIG. 3, in which it is in contact with the locking ring 21 and closes the passages 22 thereof, plasticized polymers or liquid prepolymers are prevented from being able to pass through the nonreturn valve 10, as it happens especially during the injection operation when the nonreturn valve 10 is moved together with screw 5 of extruder 2 (FIG. 2) forward (downward in FIG. 3 in the direction of arrow $P_1$) in order to inject the desired quantity of polymer/prepolymer into the molding tool 4 (FIG. 1).

If stop ring 23 is in its passage position shown in FIG. 4, in which it is arranged at an at least short axial distance from the locking ring 21, the plasticized polymers or the liquid prepolymers are able to pass through the nonreturn valve 10 (cf. arrows $P_2$ according to FIG. 4) until they are retained by the needle closing nozzle 11. This happens during the extrusion operation, when the screw 5 of the extruder 2 is rotated in the direction of arrow $P_3$. The pressure built up in the extruder 2 in the process ensures the opening of the stop ring 23 against its spring load. The nonreturn valve 10 may also be fixed detachably in a front-side threaded hole of screw 5 of extruder 2, e.g., by means of a thread 27, (cf. FIG. 5).

If a nonreturn valve 10 according to the present invention now has a seal 26 made of a sealing material from the group of the polymers, copolymers or polymer blends with a hardness lower than that of the material of the circumferential wall of the extruder, which said seal is applied to the outer circumference of the locking ring 21, leaks between the locking ring 21 and the inner wall of the extruder 2 (FIG. 2) are reliably prevented from occurring even under the very high pressure occurring during the injection operation and also in case of plasticized polymers and/or prepolymers ranging from very low viscosity to liquid, as a result of which an extremely accurate and reproducible dispensing of the injected quantity of becomes possible. Seal 26 extends preferably in one piece around the entire outer circumference of the locking ring 21 and is manufactured, for example, from wear-resistant cast polyamide PA-6G with a coefficient of thermal expansion of about $80 \times 10^{-6}$/K, to which reinforcing fibers and/or particles, for example, carbon fibers, may be additionally added to further increase the wear resistance. In addition, the sealing material may be mixed with particles suitable for dry lubrication, for example, particles consisting of molybdenum sulfide (MoS) or the like, in order to ensure a reduction of friction during the displacement of the nonreturn valve 10 or of the locking ring 21 thereof in relation to the wall of the extruder 2. Furthermore, seal 26 of the locking ring 21 may be mounted especially under a circumferential contact pressure on the circumferential wall of the extruder 2, so that it expands at an operating temperature that is higher than the temperature that occurred during mounting, and guarantees reliable, complete tightness.

Finally, FIG. 5 shows another embodiment of a nonreturn valve 10 according to the present invention, in which corresponding parts or parts having the same action are designated by the same reference numbers. The embodiment of the nonreturn valve 10 shown in FIG. 5 differs from that according to FIGS. 3 and 4 in that, on the one hand, the seal 26 is not applied to the locking ring 21 by a surface coating method but is inserted into a circumferential groove 28. Moreover, the stop ring 23 is arranged in this case rigidly, i.e., axially stationarily, at the carrying part 20 of the nonreturn valve 10, where the locking ring 21 is axially displaceable between a locked position, in which it strikes the stop ring 23 (at the bottom in FIG. 5) and a passage position, in which it strikes shoulder 25 (at the top in FIG. 5), and the locking ring 21 may be prestressed, preferably elastically, against the stop ring 23 in this case as well (not shown specifically in FIG. 5). Arrows $P_4$ indicate again the direction of flow of the polymer/prepolymer in the nonreturn valve 10 located in the passage position.

The use of a device of the above-described type for the direct production of plastic moldings is explained below as an example on the basis of exemplary embodiments:

EXAMPLE 1

Anionic Ring Opening Polymerization of ε-Caprolactam Into Polycaprolactam (PA 6)

Educts:—100 parts of c-caprolactam,
  fillers/reinforcing fibers (optional),
  1.6 parts of ε-caprolactam-blocked diisocyanate as an activator (added via mixing nozzle 3),
  2.2 parts of ε-caprolactam with sodium salt as the catalyst (added via mixing nozzle 3).

Process parameters:—Extrusion temperature approx. 70° C. to 120° C. with exclusion of moisture
  reaction temperature in molding tool approx. 155° C. to 160° C.,
  Viscosity of molten ε-caprolactam ($T_m$=69° C.): 5 mPas,
  Polymerization time 3 minutes to 5 minutes.
Products:—High-molecular-weight PA6 (yield: 99.3%).

EXAMPLE 2

Ring Opening Polymerization of Cyclic Butylene Terephthalate Oligomers (CBT) Into Semicrystalline Polybutylene Terephthalate (PBT):
  Educts:—100 parts of BCT oligomers,
    fillers/reinforcing fibers (optional),
    0.03 parts of titanium complex as an initiator (added via mixing nozzle 3).
  Process parameters:—Extrusion temperature approx. 145° C. to 160° C. with exclusion of moisture,
    reaction temperature in molding tool approx. 180° C. to 200° C.,
    viscosity of molten CBT oligomers (at 190° C.): 30 mPas (the viscosity rises after addition of the initiator within 5 minutes to 1,000 mPas),
    polymerization time 30 minutes.
  Products:—High-molecular-weight semicrystalline PBT (yield: 95% to 99%).

EXAMPLE 3

Polyaddition of Di- or Polyols with Di- or Polyisocyanates to Form Polyurethanes (PU):
  Educts:—Approx. 50 mol. % diols and/or polyols,
    approx. 50 mol. % of diisocyanates and/or polyisocyanates,
    fillers/reinforcing fibers (optional),
  Process parameters:—Extrusion temperature approx. 20° C. to 60° C.,
    reaction temperature in molding tool approx. 20° C. to 60° C.,
    viscosity of the diols and/or polyols or diisocyanates and/or polyisocyanates (at 20° C.): approx. 200 mPas,
    polymerization time (depending on the diols/polyols or diisocyanates/polyisocyanates used): approx. 10 sec to approx. 3 minutes.
  Products:—High-molecular-weight polyurethane.

The invention claimed is:

1. A device for producing plastic moldings, the device comprising:
an extruder;
a molding tool arranged downstream of a discharge opening of the extruder;
a screw guided in the extruder such that the screw is rotatable and is axially displaceable, in order to transfer plasticized or liquid polymers, prepolymers and/or monomers present in the extruder into the molding tool; and
a nonreturn valve arranged in an area of a free end of the screw, wherein at least one locking ring of the nonreturn valve acting against an inner circumferential wall of the extruder has a seal applied to at least part of an outer circumference of the locking ring, said seal sealing the locking ring against the circumferential wall of the extruder, sealing material of the seal of the locking ring being a wear-resistant material from the group of polyether ketones (PEK), the polyaryl ether ketones (PAEK), the polyhalogenated polyolefins, the high-molecular-weight polyolefins with a molecular weight of at least 100,000 g/mole and the polyamides (PA) including copolymers and polymer blends with said polymers, with a hardness lower than that of material of the circumferential wall of the extruder, wherein the sealing material of the seal of the locking ring has a coefficient of thermal expansion of at least $30 \times 10^{-6}$/K.

2. A device in accordance with claim 1, wherein the seal of the locking ring is mounted under circumferential contact pressure on the circumferential wall of the extruder.

3. A device in accordance with claim 1, wherein the polymer matrix of the sealing material of the seal of the locking ring is mixed with reinforcing fibers and/or particles.

4. A device in accordance with claim 1, wherein the polymer matrix of the sealing material of the seal of the locking ring is mixed with particles suitable for dry lubrication comprising one or more of molybdenum sulfide (MoS), graphite and polytetrafluoroethylene (PTFE).

5. A device in accordance with claim 1, wherein the sealing material of the seal of the locking ring has a temperature resistance of at least 100° C.

6. A device in accordance with claim 1, wherein the sealing material of the seal of the locking ring comprises one or more of the polyether ketones (PEK), polyether ether ketones (PEEK), polyether ether ether ketones (PEEEK), polyether ketone ketones (PEKK), polyether ether ketone ketones (PEEKK), polyether ether ketone ether ketones ((PEEKEK), polyether ketone ether ether ketones (PEKEEK) and polyaryl ether ketones (PAEK), including copolymers and polymer blends with said polymers.

7. A device in accordance with claim 1, wherein the sealing material of the seal of the locking ring comprises one or more of the polycaprolactams (PA 6), poly-(N,N'-tetramethylene adipine diamides) (PA 4.6), poly-(N,N'-hexamethylene adipine diamides) (PA 6.6), poly-(hexamethylene sebacamides) (PA 6.10), poly-(hexamethylene decane diamides) (PA 6.12), polyundecanolactams (PA 11), polylauryl lactams (PA 12), poly-(m-phenylene isophtahalamide) (PMI) and poly-(p-phenylene terephthalamide) (PPTA), including cast polyamides, and including copolymers and polymer blends with said polymers.

8. A device in accordance with claim 1, wherein the sealing material of the seal of the locking ring contains or is formed entirely from polytetrafluoroethylene (PTFE).

9. A device in accordance with claim 1, wherein the sealing material of the seal of the locking ring contains or is formed entirely from ultra-high-molecular-weight polyethylene (UHMWPE).

10. A device in accordance with claim 1, wherein the seal is applied to the outer circumference of the locking ring by surface coating or the seal is inserted into a circumferential groove of the locking ring.

11. A device in accordance with claim 10, wherein the locking ring of the nonreturn valve provided with the seal is arranged axially displaceably between a first position, in which the locking ring is in contact with an axial stop ring of the nonreturn valve and prevents the passage of liquid polymers, prepolymers and/or monomers, and a second position, in which the locking ring is arranged at a spaced location from the stop ring and makes possible the passage of liquid polymers, prepolymers and/or monomers.

12. A device in accordance with claim 10, wherein a stop ring forming a stop for the locking ring of the nonreturn valve provided with the seal is arranged axially displaceably between a first position, in which the stop ring is in contact with the locking ring of the nonreturn valve and prevents the passage of liquid polymers, prepolymers and/or monomers, and a second position, in which the stop ring is arranged at a spaced location from the locking ring and makes possible the passage of liquid polymers, prepolymers and/or monomers.

13. A device in accordance with claim 11, wherein the locking ring of the nonreturn valve provided with the seal is prestressed, elastically, in the direction of the first position, in which the locking ring is in contact with the stop ring of the nonreturn valve.

14. A device in accordance with claim 13, wherein an inlet for adding auxiliary agents, such as catalysts, activators or the like, is provided between the nonreturn valve and the discharge opening of extruder.

15. A nonreturn valve for being arranged in an area of a free end of a screw of an extruder, the nonreturn valve comprising:
a locking ring which acts against an inner circumferential wall of the extruder and which has a seal applied to at least part of a locking ring outer circumference, the seal comprising a wear-resistant sealing material selected from the group of polyether ketones (PEK), polyaryl ether ketones (PAEK), polyhalogenated polyolefins, especially the polyfluorinated polyolefins, high-molecular-weight polyolefins with a molecular weight of at least 100,000 g/mole and polyamides (PA), including copolymers and polymer blends with same with a hardness lower than that of a material of a circumferential wall of the extruder, wherein the wear-resistant sealing material has a coefficient of thermal expansion of at least $30 \times 10^{-6}$/K.

16. A device in accordance with claim 12, wherein the stop ring is elastically prestressed in a direction of the first position, in which the sop ring is in contact with the locking ring of the nonreturn valve.

17. A device in accordance with claim 1, wherein said sealing material of the seal of the locking ring is a wear-resistant material that includes polyfluorinated polyolefins.

18. A device in accordance with claim 6, wherein the sealing material of the seal of the locking ring comprises one or more of polyether imide (PEI) and polyaryl ether ketone-polyether imide blends (PAEK+PEI).

19. A device in accordance with claim 7, wherein said cast polyamides include one or more of PA 6-G and PA 12-G, said copolymers and polymer blends with said polymers comprising one or more of PA+acrylonitrile-butadiene-styrene (ABS) copolymers, PA+EVA, PA+EPDM, PA+PPE, PA+PPS and PA+rubber.

* * * * *